March 9, 1971  YOSHIJI TANIMURA  3,568,363
MOVABLE ANIMAL TOY

Filed Jan. 24, 1969  3 Sheets-Sheet 1

INVENTOR.
Yoshiji Tanimura

BY: Kelman and Berman
AGENTS

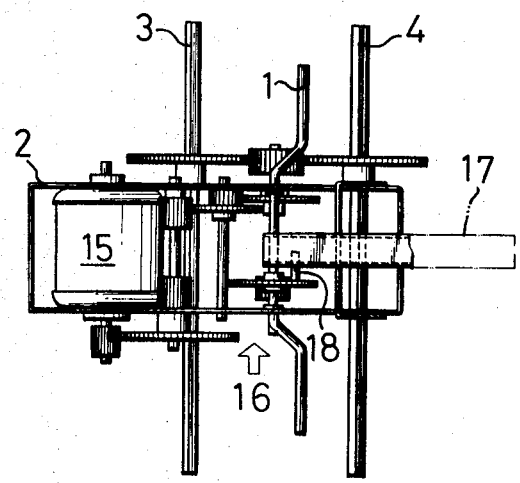
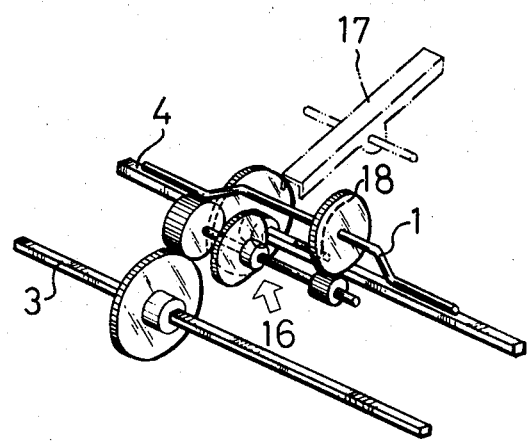
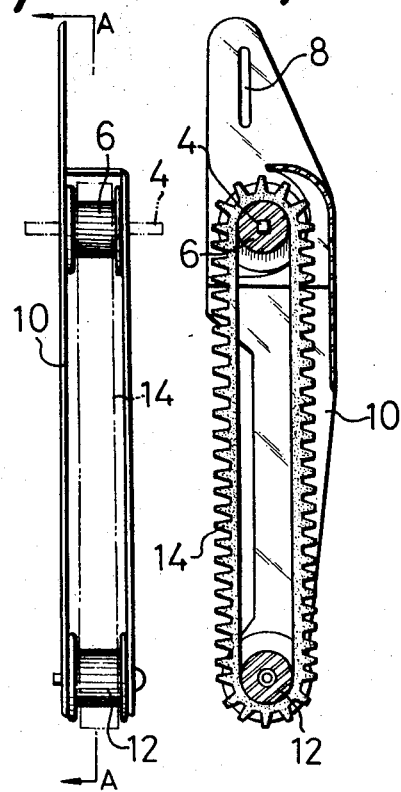

United States Patent Office 3,568,363
Patented Mar. 9, 1971

3,568,363
MOVABLE ANIMAL TOY
Yoshiji Tanimura, Saitama-ken, Japan, assignor to
Kabushiki Kaisha Bandai, Tokyo, Japan
Filed June 24, 1969, Ser. No. 836,034
Claims priority, application Japan, Sept. 12, 1968,
43/78,939
Int. Cl. A63h 11/00
U.S. Cl. 46—247                                       7 Claims

ABSTRACT OF THE DISCLOSURE

A movable animal toy provided with endless tracks each mounted on each of the front and rear legs of the animal toy which are pivotally connected thereto for continuous movement in pivotal reciprocation motion relative to one another as a crank shaft rotates. The animal toy can move as the front and rear legs are moved back and forth in pivotal reciprocation motion relative to one another by the rotating crank shaft while the endless tracks are also moved by the rotating crank shaft.

---

The present invention relates to animal toys in general. In particular, the invention is concerned with a movable animal toy which is generally shaped like a real four-footed animal.

Generally, movable animal toys of the prior art have hitherto been provided with wheels which are rotated by some means to move the animal toys. One disadvantage of conventional movable animal toys of this type lies in the fact that since they merely move on wheels, the manner of their movement lacks reality. Accordingly, an object of the present invention is to provide a movable animal toy which can move by continuously moving its front and rear legs back and forth in pivotal reciprocation motion realtive to one another, whereby the animal toy can move as if an animal were actually moving by its own legs. Another object of the invention is to provide a movable animal toy of the type described which is provided with means to overcome an obstacle which may lie ahead in its path of movement so that the animal toy can continue its forward motion irrespective of the obstacle.

According to the present invention, there is provided a movable animal toy comprising a frame or support, a crank shaft having crank portions at its opposite ends radially offset from the shaft axis in the same direction, a plurality of rotary of shafts rotatably mounted on said frame transversely thereof, one of said rotary shafts being disposed below and forwardly of said crank shaft and having a pair of front legs pivotally connected thereto and the other rotary shaft being disposed below and rearwardly of said crank shaft and having a pair of rear legs pivotally connected thereto, said opposite ends of said crank shaft being loosely received in openings formed in the front and rear legs, a plurality of pairs of driving wheels each wheel mounted on opposite ends of said plurality of rotary shafts, a plurality of pairs of driven or guide wheels, a guide wheel being rotatably mounted on the free end of each of said front and rear legs, endless tracks each trained between one of said driving wheels and one of said driven wheels so that each endless track may be mounted on each front leg and rear leg, an electric motor mounted on said frame, and a gearing connecting said crank shaft and said rotary shafts to said electric motor so that said crank shaft and said rotary shafts may be rotated simultaneously in the same direction.

Figure 1:
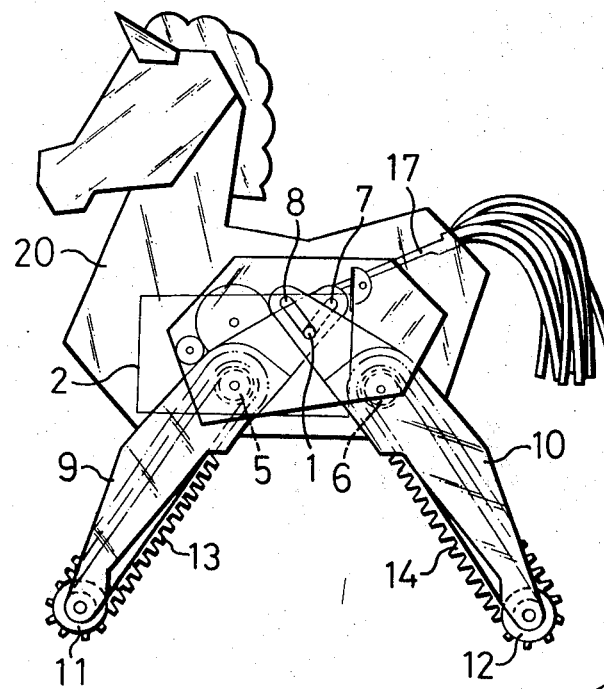
Figure 2:
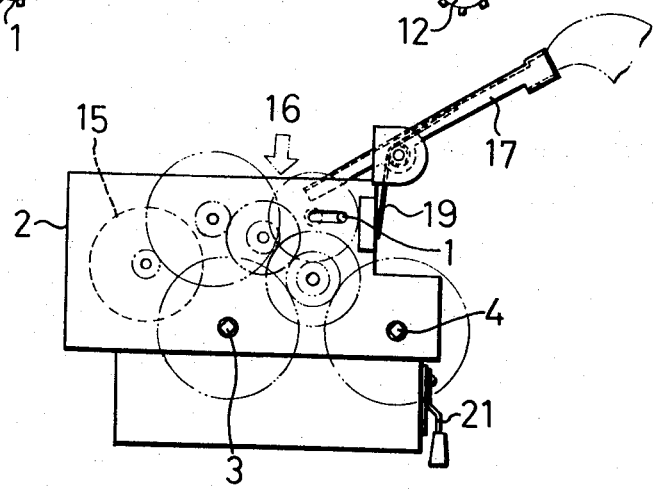
Figure 6A:
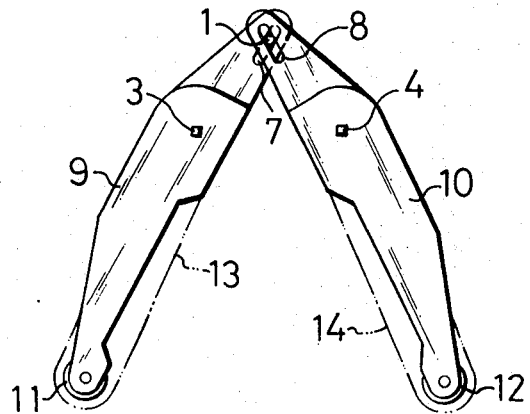
Figure 6B:
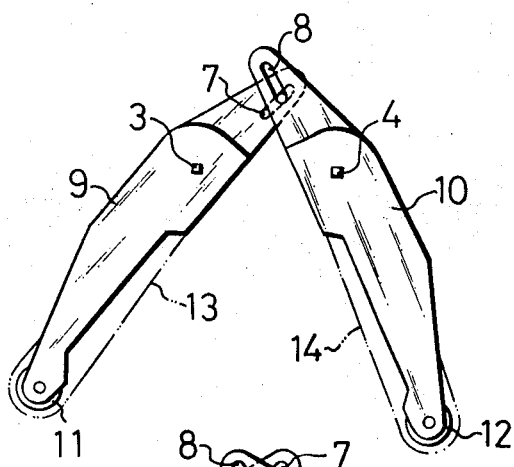
Figure 6C:
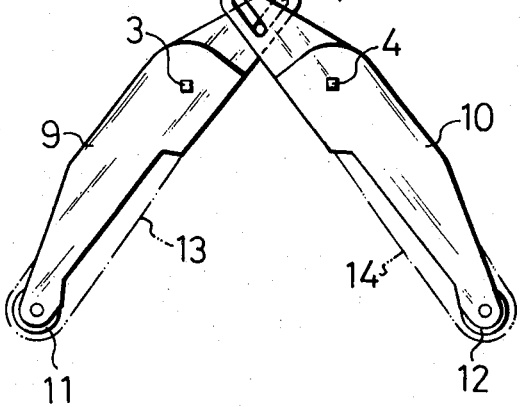

Additional objects as well as advantages and features of the invention will become apparent from the description of one embodiment of the invention set forth hereinafter when considered in conjunction with the accompanying drawings, in which:

FIG. 1 is a side view of a toy embodying this invention;
FIG. 2 is a side view of the driving portion of the toy of FIG. 1;
FIG. 3 is a plan view of the driving portion of FIG. 2;
FIG. 4 is a fragmentary perspective view of the driving portion shown in FIGS. 2 and 3;
FIG. 5a is a front view of a leg of the toy according to this invention;
FIG. 5b is a sectional view taken along the line A—A of FIG. 5a; and
FIGS. 6A to 6C are side views showing the manner in which the legs of the toy according to this invention move in reciprocation motion relative to one another.

In the embodiment shown in FIG. 1, a crank shaft 1 having crank portions at its opposite ends offset in the same direction is rotatably mounted on a support or frame 2 transversely thereof. A pair of rotary shafts 3 and 4 are also rotatably mounted on said frame 2 transversely thereof, one 3 of said rotary shafts being disposed below and forwardly of said crank shaft 1 and the other rotary shaft 4 being disposed below and rearwardly of said crank shaft 1. Said rotary shaft 3 has firmly fixed to its opposite ends a pair of driving wheels 5, and shaft 4 similarly carries wheels 6 which rotate with the rotary shaft 4. Said rotary shaft 3 pivotally supports a pair of front legs 9 which enclose said driving wheels 5 and said rotary shaft 4 supports a pair of rear legs 10, which enclose said driving wheels 6.

Each of said front legs 9 is formed near its top with a slot 7 for loosely receiving therein one of the opposite ends of said crank shaft 1, and each of said rear legs 10 is formed with a corresponding slot 8 for loosely receiving therein the shaft 1.

Each of the front and rear legs 9 rotatably supports a driven guide wheel 11 at its free end, and each of said rear legs 10 rotatably supports a driven wheel 12 at its free end. An endless track 13 is trained between said driven wheel 11 and the driving wheel 5 of each front leg and enclosed therein, and an endless track 14 is trained between said driven wheel 12 and the driving wheel 6 of each rear leg 10 and enclosed therein.

The front and rear legs 9 and 10 are each formed with a cutout so that the endless tracks 13 and 14 project from the front and rear legs to climb over or negotiate an obstacle that may lie ahead in the path of movement of the animal toy. An electric motor 15 is mounted on the frame 2. A gearing 18 is mounted between said electric motor 15, the crank shaft 1 and the rotary shafts 3 and 4 to cause the shafts to rotate in the same direction. A rod 17 is pivoted to the frame 2 and moved against the biasing force of a spring 19 by a projection 18 on one of the gears of the gearing 16.

A tail is attached to the rod 17. 20 is a shell having the shape of an animal, for example a horse, made of a transparent material which envelops the frame 2, the shafts 1, 3, 4, and the drive arrangement. 21 is a switch of the power source.

In operation, the switch 21 of the power source is closed to rotate the motor 15 which causes, through the gearing 16, the crank shaft 1 and the rotary shafts 3 and 4 to rotate. Rotation of the rotary shafts 3 and 4 causes the driving wheels 5 and 6 to rotate so as to thereby drive the endless tracks 13 and 14. At the same time, rotation of the crank shaft 1 loosely received at its opposite ends in the slots 7 and 8 formed in the front legs 9 and the rear legs 10 causes the front legs and the rear legs to pivot on the rotary shafts 3 and 4 respectively and move in reciprocation motion in opposite direction relative to one another as shown in FIGS. 6A to 6C. More specifically, FIG. 6A shows the front leg 9 and the rear leg 10 in a position in which the distance between the two legs is at a minimum. As the crank shaft 1 rotates, the distance between the legs 9 and 10 shown in FIG. 6A is gradually increased into a position shown in FIG. 6B which shows the legs in an intermediate position. Further rotation of the crank shaft 1 brings the legs into a position shown in FIG. 6C in which the distance between the legs is greatest.

Still further rotation of the crank shaft 1 causes the legs 9 and 10 to reverse the direction of their movement and reach the position shown in FIG. 6A. This cycle of operation is repeated.

From the foregoing description, it will be appreciated that the front legs and the rear legs are caused to move in pivotal motion in opposite directions relative to one another by the crank shaft, so that the animal toy embodying this invention can move as if a real animal were moving on its own legs.

It is possible to cause the animal toy to move by means of these pairs of legs alone. The invention offers an additional advantage in that the endless tracks mounted on these front and rear legs are moved at the same time as the legs are moved in pivotal motion, whereby the animal toy can move smoothly and in a stable manner.

Combined with the pivotally moved front and rear legs, the endless tracks permit the animal toy embodying this invention to overcome an obstacle that may lie ahead in its path of movement so that it can continue its forward motion irrespective of the obstacle. While the invention has been described as being applied to a horse toy, it is to be understood that the invention is not restricted to this animal and that the invention can be incorporated in another animal toy without departing from the spirit and scope of the invention.

What I claim is:
1. A toy comprising, in combination:
   (a) a support extending in a predetermined direction;
   (b) three shafts mounted on said support for rotation about respective substantially parallel, spaced axes transverse of said direction;
   (c) crank means on a first one of said shafts, said crank means being radially offset from the axis of said first shaft;
   (d) two leg members mounted on the second and third ones of said shafts respectively for pivoting movement about the axes of the associated shafts, each leg member being formed with an opening engaged by said crank means and having a free end portion remote from the axis of the associated shaft;
   (e) a driving member mounted on each of said second and third shafts adjacent the associated leg member for rotation about the axis of the associated shaft;
   (f) a guide member on each of said free end portions;
   (g) an endless track member trained over the driving member and the guide member associated with each leg member; and
   (h) drive means operable for simultaneously driving said first shaft and said driving members.

2. A toy as set forth in claim 1, wherein said drive members are fixedly secured to said second and third shafts respectively, said drive means when operating simultaneously turning said second and third shafts in a common direction about the respective axes.

3. A toy as set forth in claim 1, wherein said openings are elongated radially relative to the axes of said second and third shafts respectively and dimensioned for longitudinal sliding engagement by said crank means.

4. A toy as set forth in claim 1, further comprising another leg member pivotally mounted on each of said second and third shafts and axially spaced from said first-mentioned two leg members, said other leg members each being formed with an opening engaged by said crank means and having a free end portion remote from the axis of the associated shaft, another driving member mounted on each of said second and third shafts adjacent the associated other leg members, a guide member on each free end portion of said other leg members, and an endless track member trained over the driving member and the guide member associated with each of said other leg members, said drive means when operating driving the driving members associated with said other leg members.

5. A toy as set forth in claim 4, wherein said first shaft has two axially spaced crank portions offset from the axis of said first shaft and jointly constituting said crank means, one crank portion engaging the openings of said two leg members, and the other crank portion engaging the openings of said other leg members.

6. A toy as set forth in claim 5, wherein the free end portions of said leg members are spaced from the axes of the associated shafts in a common direction.

7. A toy as set forth in claim 6, further comprising a shell enveloping said support, said shafts and said drive means.

References Cited
UNITED STATES PATENTS

| | | | |
|---|---|---|---|
| 3,178,853 | 4/1965 | Greenwood et al. | 46—123X |
| 3,163,960 | 1/1965 | Iwaya | 46—123X |
| 3,267,607 | 8/1966 | Ryan | 46—247 |

LOUIS G. MANCENE, Primary Examiner

R. F. CUTTING, Assistant Examiner

U.S. Cl. X.R.
46—123